United States Patent [19]

Tsui

[11] Patent Number: 5,685,057
[45] Date of Patent: Nov. 11, 1997

[54] DRILL BUSHING ASSEMBLY AND METHOD

[75] Inventor: Gary Tsui, San Gabriel, Calif.

[73] Assignee: CBC Industries, Inc., City of Commerce, Calif.

[21] Appl. No.: 431,895

[22] Filed: May 1, 1995

[51] Int. Cl.$^6$ .................. B21D 39/04; B23B 49/02
[52] U.S. Cl. .................. 29/516; 29/520; 408/72 B; 408/241 B
[58] Field of Search .................. 408/72 B, 115 B, 408/241 B; 29/515, 516, 520

[56] References Cited

U.S. PATENT DOCUMENTS

| | | | |
|---|---|---|---|
| 2,544,759 | 3/1951 | Johnson | 29/520 |
| 2,644,350 | 7/1953 | Regimbald | 408/241 B |
| 5,056,965 | 10/1991 | Tsui et al. | 408/241 B |

Primary Examiner—Steven C. Bishop
Attorney, Agent, or Firm—Bruce A. Jagger

[57] ABSTRACT

A method of assembling a headed bushing from a headless bushing and a bushing head, and the resulting headed bushing. Selecting a bushing head which has a deformable flange and a bushing engaging sector on its inside cylindrical wall. Selecting a headless bushing and forming a groove on its exterior surface to engage with the deformable flange, and a head engaging sector to engage with the bushing engaging sector. Assembling the two together and upsetting the flange into the groove to hold the assembly together.

8 Claims, 2 Drawing Sheets

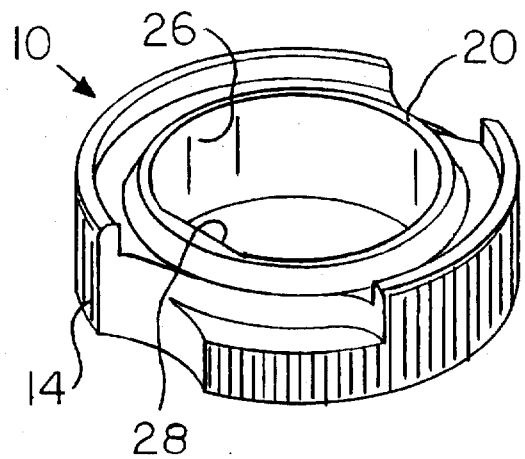
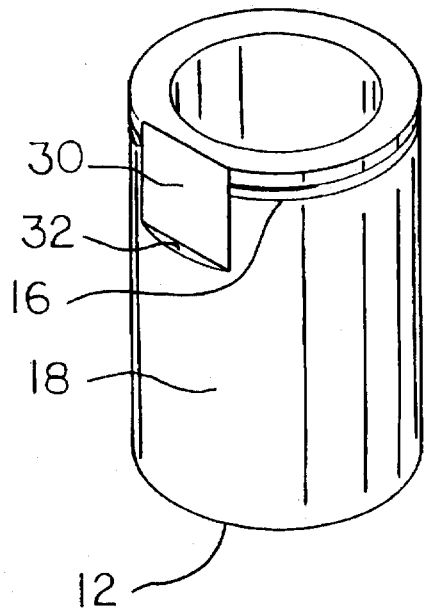
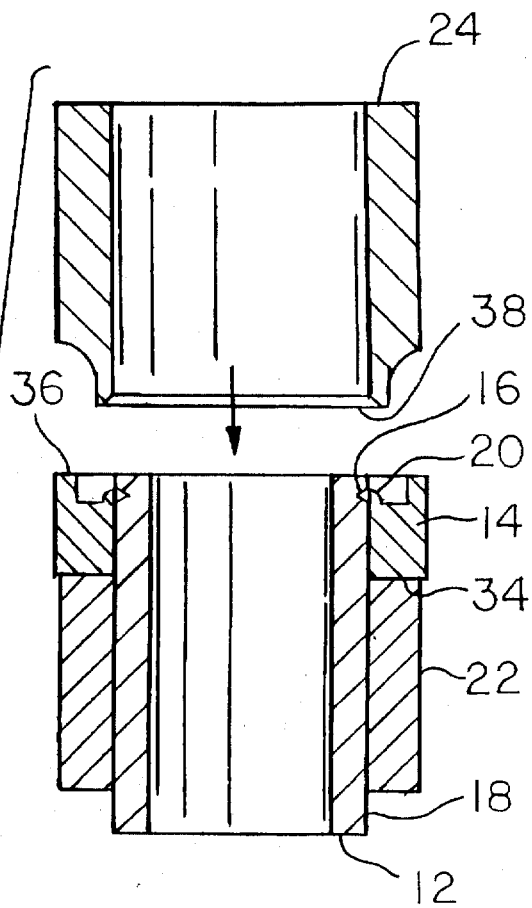
FIG. 1
FIG. 2

DRILL BUSHING ASSEMBLY AND METHOD

BACKGROUND OF THE INVENTION

1. Field of the Invention

The invention relates in general to assembled headed drill bushings, the components of an assembled headed bushing, a method of assembling headed drill bushings, and, in particular, to headed drill bushings assembled from a limited inventory of standard components.

2. Description of the Prior Art

Tsui et al U.S. Pat. No. 5,056,965, patented Oct. 15, 1991, is directed to a method of inventory control wherein inventories of headless bushings and bushing heads are maintained from which selections and appropriate operations are performed in assembling the two together. Difficulties have been encountered in the means of securing the bushing heads to the headless bushings. Those concerned with these problems recognize the need for improvement. These and other difficulties of the prior art have been overcome according to the present invention.

BRIEF SUMMARY OF THE INVENTION

A preferred embodiment of the assembly and method according to the present invention comprises a headed bushing which is assembled from an inventory of standard headless bushings and a separate inventory of bushing heads with a minimum of simple operations. In general, a circumferential groove or other indentation is formed in the headless bushing. The overall outside diameter of the headless bushing may or may not be reduced dependent upon the customers needs. The indentation in the headless bushing is adapted to engage an upsettable flange or boss on the bushing head. In general, the upsettable flange or boss is deformed into the indentation to hold the bushing and head in the desired assembled configuration. Preferably, mating discontinuities are provided on the bushing and head which serve to index the head with the bushing during assembly and to prevent the head from rotating relative to the bushing during use.

Other advantages and novel features of the present invention will become apparent from the following detailed description of specific embodiments of the invention, particularity when considered in conjunction with the accompanying drawings.

BRIEF DESCRIPTION OF THE DRAWINGS

Referring particularly to the drawings for the purposes of illustration and not limitation:

FIG. 1 is an exploded perspective view of a preferred embodiment of the invention.

FIG. 2 is an exploded cross-sectional view of a preferred embodiment of this invention during assembly.

DETAILED DESCRIPTION OF THE PREFERRED EMBODIMENTS

Figure 3:
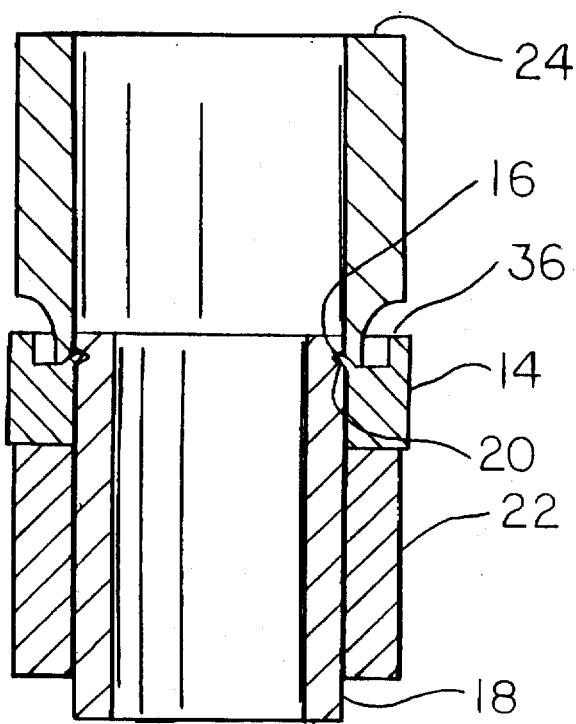
FIG. 3 is a cross-sectional view of the embodiment of FIG. 2 at the completion of the assembly step.
Figure 4:
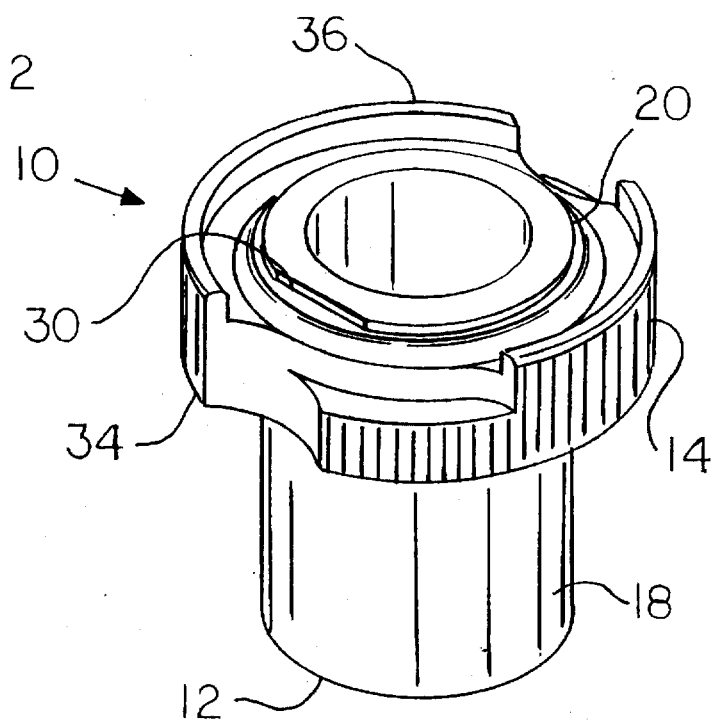
FIG. 4 is a perspective view of a fully assembled embodiment.

Referring particularly to the preferred embodiment which is illustrated in the drawings there is shown generally at 10, a headed bushing assembly which includes a right cylindrical headless bushing 12 and a separate bushing head 14. Like reference numerals designate identical or corresponding parts throughout the several views.

As will be understood by those skilled in the art, headless bushings are available in a variety of standard lengths, and inside and outside diameters. The present invention is applicable to these standard sizes as well as to such special sizes as may be desired. Those skilled in the art will also appreciate that the head portions of standard headed bushings where the heads are integral with the cylindrical bushing are available in a variety of standard configurations. The separate bushing heads, according to the present invention, can be formed into any of those standard configurations to accommodate existing tooling standards, as well as into special non-standard configurations.

An indentation which, in the embodiment illustrated, is in the form of a substantially continuous circumferential groove 16, is formed in the outside cylindrical wall 18 of headless bushing 12. Separate bushing head 14 includes a flange or boss 20, which, in the embodiment illustrated, is in the form of a substantially continuous flange surrounding the inside diameter of the bushing head 14. The flange 20 is adapted to being deformed so as to engage with groove 16.

In the embodiment chosen for the purposes of illustration the inner cylindrical wall 26 of bushing head 14 is interrupted by a discontinuity in the form of an internal sector 28, and the outer cylindrical wall 18 of bushing 12 is interrupted by a discontinuity in the form of an external sector 30. Internal sector 28 and external sector 30 are adapted to interengage with one another so as to position bushing head 14 axially along the outer cylindrical wall 18. Groove 16 is thus indexed to flange 20 by the engagement of the edge of sector 28 with the bottom 32 of sector 30. The interengagement of sectors 28 and 30 also prevents bushing head 14 from rotating around headless bushing 12 during use.

The headed bushing assembly 10 is conveniently assembled using a socket 22 and a flange deforming tool 24. See, for example, FIGS. 2 and 3. In the embodiment chosen for illustrations, the headless bushing 12 is mounted in socket 22 and bushing head 14 is positioned with flange 20 adjacent to and generally surrounding groove 16. A first axial face 34 of bushing head 14 is supported by the axial end of socket 22. A second axial face 36 of bushing head 14 is outwardly facing and is exposed. One axial end of flange deforming tool 24 is provided with a generally conical surface 38. When flange deforming tool 24 is urged axially towards bushing head 14, conical surface 38 is adapted to engage with and deform flange 20 into groove 16. See, for example, FIG. 3. Socket 22 supports bushing head 14 while flange 20 is deformed by tool 24. As will be understood by those skilled in the art, flange 20 may be upset by different metal forming means if desired.

Because of the requirements placed on bushings during use in guiding drills, taps, and the like, they are generally made of steel which is heat treated to a very hard state. In general, it is preferred that the bushing heads also be made of metal or the like. The heads are not subjected to the same wear and tear as the bushings so they need not be so hard. Bushing heads are generally of such a configuration that several machining operations are required to fabricate them out of a single piece of metal. It has been found that bushing heads can be fabricated to final dimensions using conventional powder metal technology, thus saving substantially on machining operations and wasted stock. Making the heads separate from the bushings makes it possible to take advantage of these savings.

Forming the indentation and discontinuity in cylindrical wall 18, after the headless bushing has been fully manufactured, in response to an order from a customer for a specific length and inside and outside diameter headed bushing, eliminates the need to maintain an inventory of assorted headed bushings. The indentation and discontinuity can be formed by grinding or machining, even in fully hardened headless bushings, rapidly and without impairing the accuracy of the bushing. These are simple and inexpensive operations to perform, as compared with shaping the head from a single piece of metal. An inventory of fully formed heads for each head style and inside diameter can be maintained with much less expense than would be required to maintain an inventory of headed bushings for every inside diameter and length for a given outside diameter. The separate heads are independent of the length and inside diameter of the bushings so only one head size need be stocked to form a wide variety of inside diameters and lengths upon demand. It is relatively inexpensive to maintain an inventory of a full assortment of headless bushings because the operations required to produce them are relatively inexpensive as compared to producing headed bushings.

What has been described are preferred embodiments in which modifications and changes, substitutions and reversals of parts may be made without departing from the spirit and scope of the accompanying claims. It is therefore to be understood that, within the scope of the accompanying claims, the invention may be practiced otherwise than as specifically described.

What is claimed is:

1. Method comprising:

maintaining an inventory of generally right cylindrical headless bushings having outer and inner generally cylindrical surfaces and assorted outside and inside diameters;

maintaining an inventory of bushing heads having an assortment of internal diameters, said bushing heads having internal diameters corresponding to the outside diameters of said headless bushings, each of said internal diameters being interrupted by an internal sector, each of said bushing heads including a generally annular flange approximately surrounding said internal diameter on a normally outwardly facing face of said bushing head;

selecting a headless bushing having a first outside diameter from said inventory of headless bushings;

forming a generally circumferential groove in an outer cylindrical surface of said bushing;

removing an external sector from an outer cylindrical surface of said bushing to form an index sector;

selecting a bushing head having an internal diameter sufficient to provide a snug fit with said first outer diameter from said inventory of bushing heads;

mounting said selected bushing head on said selected headless bushing with said index sector in registration with said internal sector and said generally annular flange adjacent to and generally surrounding said generally circumferential groove; and deforming said generally annular flange into said generally annular groove to fix said selected bushing head to said selected headless bushing.

2. Method comprising:

maintaining an inventory of generally right cylindrical headless bushings having outer and inner generally cylindrical surfaces and assorted outside and inside diameters;

maintaining an inventory of bushing heads having an assortment of internal diameters, said bushing heads having internal diameters corresponding to the outside diameters of said headless bushings, each of said internal diameters being interrupted by a bushing engaging discontinuity, each of said bushing heads including an upsettable flange approximately adjacent said internal diameter;

selecting a headless bushing having a first outside diameter from said inventory of headless bushings;

forming an indentation in an outer cylindrical surface of said bushing;

making a portion of an outer cylindrical surface of said bushing into a head engaging discontinuity, said head engaging discontinuity being adapted to mate with said bushing engaging discontinuity;

selecting a bushing head having an internal diameter sufficient to provide a snug fit with said first outside diameter from said inventory of bushing heads;

mounting said selected bushing head on said selected headless bushing with said bushing engaging discontinuity in engagement with said head engaging discontinuity and said upsettable flange adjacent to said indentation; and deforming said upsettable flange into said indentation to fix said selected bushing head to said selected headless bushing.

3. A method of claim 2 including forming said bushing head from powdered metal.

4. An assembled headed bushing comprising:

a generally right cylindrical bushing having inner and outer cylindrical walls approximately concentric with each other, an indentation formed in an outer cylindrical wall, and a head engaging discontinuity formed in an outer cylindrical wall;

a bushing head having an internal cylindrical wall, said internal cylindrical wall being interrupted by a bushing engaging discontinuity, said internal cylindrical wall being adapted to mate with said outer cylindrical wall with said head engaging discontinuity in engagement with said bushing engaging discontinuity, an upsettable flange formed in said bushing head, and said upsettable flange being deformed into and interlocked with said indentation.

5. An assembled headed bushing comprising:

a generally right cylindrical bushing having inner and outer cylindrical walls approximately concentric with each other, a generally circumferential groove formed in said outer cylindrical wall, and an external segment removed from the outer cylindrical wall at a first end of said generally right cylindrical bushing forming an index segment;

a bushing head having an internal cylindrical wall and a generally exposed axial face, said internal cylindrical wall being interrupted by an internal segment, said internal cylindrical wall being adapted to mate with said outer cylindrical wall with said index segment in registration with said internal segment, a generally annular flange formed in said exposed axial face, and said generally annular flange being interlocked with said generally circumferential groove.

6. An assembled headed bushing of claim 5 wherein said internal segment has a straight internal face.

7. An assembled headed bushing of claim 5 wherein said generally annular flange is continuous.

8. An assembled headed bushing of claim 5 wherein said generally circumferential groove is continuous.

* * * * *